United States Patent [19]

Sharma

[11] 4,268,324

[45] May 19, 1981

[54] FABRICATION OF SPECTRALLY SELECTIVE SOLAR SURFACES BY THE THERMAL TREATMENT OF AUSTENITIC STAINLESS STEEL AISI 321

[76] Inventor: Vinod C. Sharma, B28, Ugbowo Campus, Uniben, Nigeria

[21] Appl. No.: 16,571

[22] Filed: Apr. 20, 1979

[51] Int. Cl.³ .............................................. B32B 15/18
[52] U.S. Cl. ................................ 148/31.5; 148/6.35; 428/469; 126/901
[58] Field of Search ...................... 148/31.5, 6.3, 6.35; 126/270, 271, 901; 428/469, 472, 628, 629; 75/128 T

[56] References Cited

U.S. PATENT DOCUMENTS

| | | | |
|---|---|---|---|
| 2,917,817 | 12/1959 | Tabor | 428/469 |
| 3,660,173 | 5/1972 | Matsuno et al. | 148/6.35 |
| 3,963,530 | 6/1976 | Smollett et al. | 148/31.5 |
| 4,097,311 | 6/1978 | Ishibashi et al. | 148/31.5 |

OTHER PUBLICATIONS

*Steel Products Manual, Stainless and Heat Resisting Steels;* American Iron and Steel Institute, Washington, D. C., p. 146, (12/74).

*Primary Examiner*—Michael L. Lewis

[57] ABSTRACT

The spectrally selective solar surfaces have been produced after heating the austenitic stainless steel AISI 321 at a firing temperature of 843° K. and for firing times ranging from 10 to 20 minutes. The heating was carried out in a constant temperature oven under normal atmospheric conditions. The optimum values of solar absorptance $\alpha_s$ and near-normal emittance $\epsilon_s$ were found to be $\alpha_s = 0.92 + 0.02$, $\epsilon_s = 0.22 \pm 0.02$ respectively. The corresponding values for the unheated steel were $0.50 \pm 0.02$ and $0.22 \pm 0.22$. Severe temperature treatments like quenching in liquid nitrogen at 77° K. produced no adverse visible affect on the quality of the selective surfaces. It shows that the thermal coatings so produced are very tough and durable. The value of solar absorptance and near-normal thermal emittance remained unchanged after quenching in liquod nitrogen.

The thermal coatings so produced not only offer a technical advantage but also economic advantage over any of the existing techniques for the manufacture of stainless steel solar panels.

1 Claim, No Drawings

FABRICATION OF SPECTRALLY SELECTIVE SOLAR SURFACES BY THE THERMAL TREATMENT OF AUSTENITIC STAINLESS STEEL AISI 321

SUMMARY

Spectrally selective solar surfaces of stainless steel AISI 321 have been obtained by firing the steel samples (dimensions 7.5×7.5×0.05 cm) in a constant temperature oven at 843 K, under normal atmospheric conditions. The samples were heated for times ranging from 10 to 20 minutes. The values of solar absorptance $\alpha_s$ and near-normal thermal emittance $\epsilon_s$ of the heated samples were found to be $\alpha_s=0.92\pm0.02$ and $\epsilon_s=0.22\pm0.02$. The values of $\alpha_s$ and $\epsilon_s$ for unheated steels are $\alpha_s=0.50\pm0.02$, $\epsilon_s=0.22\pm0.02$. The simplicity of technique offers an attractive alternative to the stainless steel manufacturers for the production of spectrally selective solar panels at much lower costs.

DETAILED DESCRIPTION

With the ever increasing demand of energy and diminishing conventional resources, it has become necessary to look for alternative renewable source of energy, the most prominent of which is the solar energy.

Solar energy can be tapped in many ways. But one of the most promising aspect of solar energy conversion which holds out hopes for the future is through the fabrication of potentially cheap spectrally selective solar surfaces. At present, the commonly known techniques for obtaining spectrally selective solar surfaces are:

I. Chemical immersion
II. Chemical vapour deposition
III. Electrodeposition
IV. Vacuum deposition
V. Microgrooving In most cases, however, either the semiconductor is coated on to the metal substrate or the metal substrate itself is converted into semiconductor. These techniques are often complex, time-consuming and expensive.

Normally, copper sheets are employed for the fabrication of spectrally selective surfaces. But since copper is fast disappearing from this planet, it was felt desirable to make use of stainless steels and other ferritic steels, the main constituent of which is iron and iron is available in abundance in nature. Moreover, stainless steels offer tough resistance to corrosion.

In the present work, an entirely new technique of fabricating spectrally selective solar surfaces is described. The technique does not involve any of the above mentioned techniques nor does it make use of the copper metal. It involves a thermal treatment of austenitic stainless steel AISI 321 in a constant temperature oven under controlled conditions of temperature and time.

The percentage composition (by weight) of austenitic stainless steel AISI 321 is
Cr: 18.2
Ni: 8.2
C: 0.11
Ti: 0.6
W: 0.6
Si: 0.2

Twenty samples of the stainless steel of above mentioned composition and of dimensions 7.5×7.5×0.05 cm were fired in a constant temperature oven at various temperatures ranging from 593 K to 1293 K under normal atmospheric conditions and for times from 5 to 30 minutes. The samples were then removed from the oven and allowed to cool to room temperature. After heating, many samples had blue coatings formed on them, presumably, of chromium oxide. The best surface coatings (blue in colour) were formed at a firing temperature of 843 and for times ranging from 10 to 20 minutes. Table I shows the measured values of solar absorptance $\alpha_s$ and near-normal thermal emittance $\epsilon_s$ for the fired samples. It can be seen from the Table that the optimum values of solar absorptance and thermal emittance are $\alpha_s=0.92\pm0.02$ and $\epsilon_s=0.22\pm0.02$. These values are obtained at 843 K. The corresponding values for the unheated steel are $\alpha_s=0.50\pm0.02$ and $\epsilon_s=0.22\pm0.02$. It shows clearly that the heat treated samples are spectrally selective and act as high absorbers of solar energy but low emitters of thermal energy. No pre-heating treatments were given to the samples used although, it is expected that the value of thermal emittance quoted above will decrease if the surfaces are well polished before the thermal treatment.

Severe tests such as quenching in liquod nitrogen at 77 K produced no visible adverse affects upon the selective surfaces so produced, indicating that the thermal coatings were very tough and durable. Also the values of solar absorptance and near-normal thermal emittance remained unchanged which goes on to confirm that the quality of the coatings did not change even after such severe temperature treatments.

It is my belief that similar thermal treatments given to other stainless steels (just as ferritic steels) will also result in selective solar surfaces.

TABLE I

| Sample | Firing time (Minutes) | Oven temp. ± 10K | Solar absorptance $\alpha_s \pm 0.02$ | Near-normal thermal emittance $\epsilon_n \pm 0.02$ |
|---|---|---|---|---|
| 1 | 5 | 593 | 0.54 | 0.24 |
| 2 | 10 | 593 | 0.54 | 0.23 |
| 3 | 15 | 593 | 0.56 | 0.20 |
| 4 | 20 | 593 | 0.56 | 0.19 |
| 5 | 25 | 593 | 0.54 | 0.19 |
| 6 | 30 | 593 | 0.54 | 0.20 |
| 7 | 5 | 843 | 0.89 | 0.22 |
| 8 | 10 | 843 | 0.92 | 0.21 |
| 9 | 15 | 843 | 0.92 | 0.22 |
| 10 | 20 | 843 | 0.92 | 0.20 |
| 11 | 25 | 843 | 0.90 | 0.21 |
| 12 | 30 | 843 | 0.90 | 0.23 |
| 13 | 5 | 1043 | 0.86 | 0.23 |
| 14 | 10 | 1043 | 0.86 | 0.22 |
| 15 | 15 | 1043 | 0.84 | 0.22 |
| 16 | 20 | 1043 | 0.86 | 0.24 |
| 17 | 25 | 1043 | 0.86 | 0.22 |
| 18 | 30 | 1043 | 0.78 | 0.22 |
| 19 | 5 | 1293 | 0.84 | 0.30 |
| 20 | 10 | 1293 | 0.88 | 0.31 |
| Unheated Steel | — | 303 | 0.50 | 0.22 |

I claim:

1. Spectrally selective solar absorber coatings blue in colour having values of solar absorptance of $0.92\pm0.02$ and thermal emittance of $0.22\pm0.02$ are obtained by heating unpolished austenitic stainless steel AISI 321 at 843 for 10 to 20 minutes under normal atmospheric conditions; the type of selective coatings depending upon the combined effect of firing temperature and firing time.

* * * * *